UNITED STATES PATENT OFFICE.

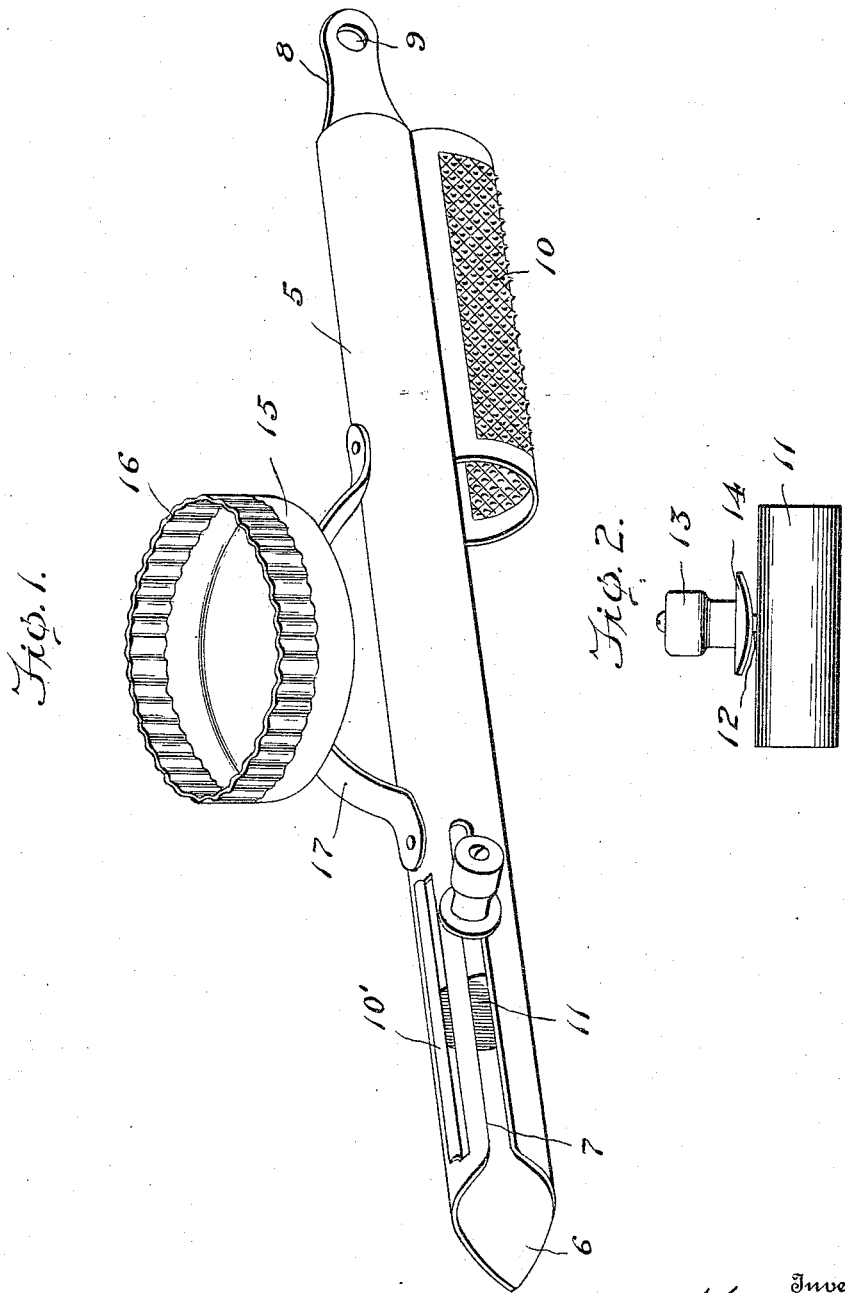

JOSEPH F. RELLINGER, OF DETROIT, MICHIGAN.

KITCHEN UTENSIL.

1,184,211.  Specification of Letters Patent.  Patented May 23, 1916.

Application filed May 22, 1914. Serial No. 840,324.

*To all whom it may concern:*

Be it known that I, JOSEPH F. RELLINGER, a citizen of the United States, residing at Detroit, in the county of Wayne and State of Michigan, have invented certain new and useful Improvements in Kitchen Utensils, of which the following is a specification.

This invention relates to kitchen utensils and has primarily for its object to provide a simple and efficient device which may be utilized in various kitchen capacities.

Another object of the invention is to provide a device which is especially adaptable for the coring of fruit, suitable means being associated therewith by which the core is dispelled from the device after it has been removed from the fruit.

Other objects as well as the nature, characteristic features, and scope of my invention will be more readily understood from the following description taken in connection with the accompanying drawings and pointed out in the claim forming a part of this specification.

Referring to the drawings: Figure 1 is a perspective view of the utensil constructed in accordance with my invention, Fig. 2 is a side elevation of the plunger for dispelling materials from the tubular member in which it is mounted.

In the drawings wherein is illustrated the preferred embodiment of this invention, an elongated cylindrical member 5 is provided, one end 6 of which is sharpened and pointed to facilitate its penetration in fruit which is to be cored, said end being further provided with an elongated slot 7, while the opposite end 8 is extended and provided with an eye 9, by which it is engaged with a suitable supporting member on the wall or the like. Mounted on one end of the member 5 in proximity to the hanger 8 is a grater 10, which may be used for the grating of nutmeg, horseradish or the like, the opposite end of said member being provided with a knife 10′ which is formed by striking up a portion of the member 5 and sharpening the free marginal edge thereof, so as to provide a peeler for fruit or vegetables. The knife element 10′ preferably extends in parallelism with the slot 7, thereby affording a maximum cutting blade.

Mounted for movement in the member 5 is a plunger 11, which in the present instance is of a cylindrical configuration conforming to the contour of said member 5 and is preferably made of wood, although any other desirable material may be used, said plunger having extending from the outer periphery thereof a shank 12 which extends through an operating handle 13, the latter being engaged at its inner end with a washer or disk 14, said disk being arcuated to conform to the configuration of the member 5, so as to be slidable thereon over the slot 7 when pressure is exerted on the handle 13. The plunger 11 is used for dispelling materials which gather therein, as for instance in the coring of apples, the core would lie in the member 5 and by merely actuating the plunger 11, through the medium of the handle 13, in the slot 7, the core will be readily ejected from the member 5.

Mounted on the outer periphery of the member 5 approximately midway its ends is a cookie mold 15, the marginal edge 16 of which is crimped, said mold being supported on a member 5 by a loop strap 17, the opposite edge of the latter being secured to the member in any suitable manner. This mold not only serves in the capacity above stated, but likewise provides an abutment for the hand of the person using the utensil when it is used in the capacity of an apple or other fruit corer, it being seen that when the pointed end 6 of the member 5 is penetrated in the fruit, that pressure may be exerted on the mold 15 in order to facilitate the coring of the fruit.

From the above it is obvious that a simple, efficient, and durable utensil is provided which is inexpensive to manufacture, and is especially adapted for the coring of fruit, although the other functions may be efficiently performed at the option of the user.

It will be understood that the above description and accompanying drawings comprehend only the general and preferred embodiment of my invention and that various minor changes in details of construction, proportion and arrangement of parts may be made within the scope of the appended claim and without sacrificing any of the advantages of my invention.

Having thus fully described my invention what I claim as new and desire to secure by Letters Patent is:

In a corer, a body portion having a longitudinally extending bore, a coring blade formed at one end of said body portion, said end portion being beveled to form a cutting point, said body provided with a longitudinal slot open to one end thereof and extending from the base of the bevel, an ejector slidable in and fitting the walls of said longitudinal bore, a shank on said ejector projecting through said slot, and a handle on said shank, whereby said ejector may be readily inserted into and removed from said bore, as and for the purpose specified.

In testimony whereof I affix my signature in presence of two witnesses.

JOSEPH F. RELLINGER.

Witnesses:
GEORGE MARR,
SAMUEL ISRAEL.

Copies of this patent may be obtained for five cents each, by addressing the "Commissioner of Patents, Washington, D. C."